Nov. 21, 1933.   B. M. STRADLING   1,935,998
CORSET MEASURING DEVICE
Filed Oct. 8, 1932   2 Sheets-Sheet 1
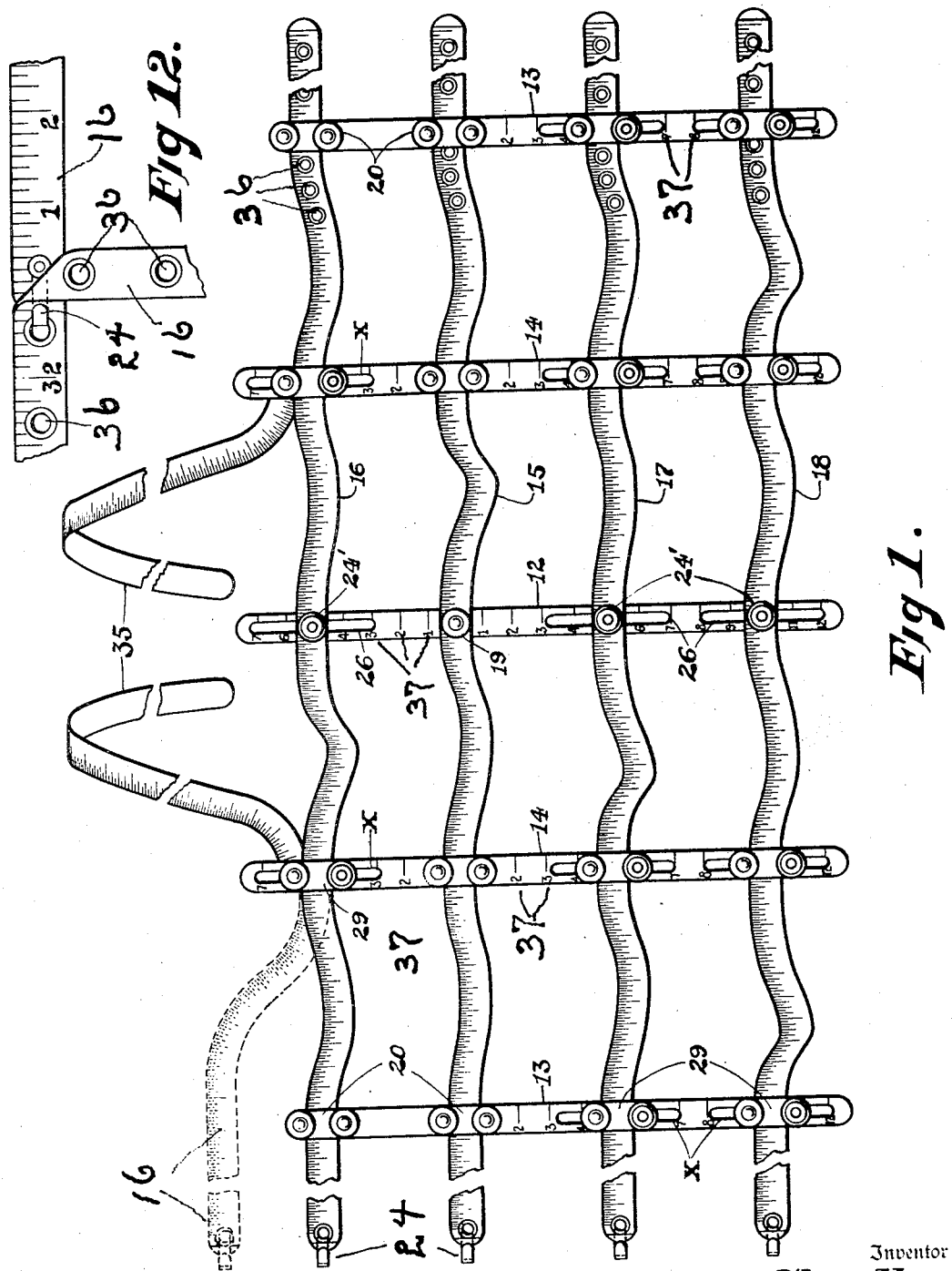

Nov. 21, 1933.  B. M. STRADLING  1,935,998
CORSET MEASURING DEVICE
Filed Oct. 8, 1932   2 Sheets-Sheet 2
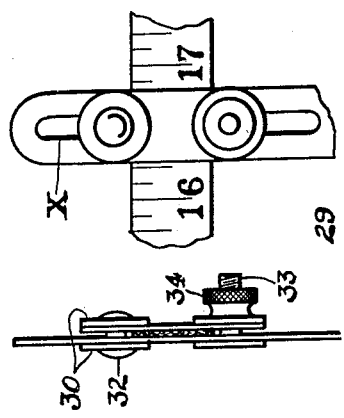
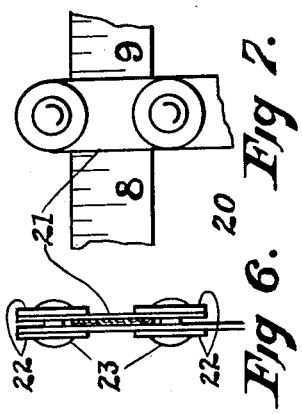
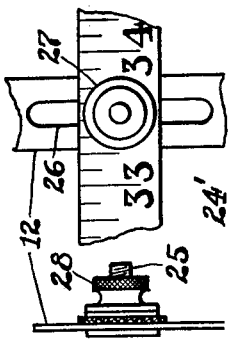
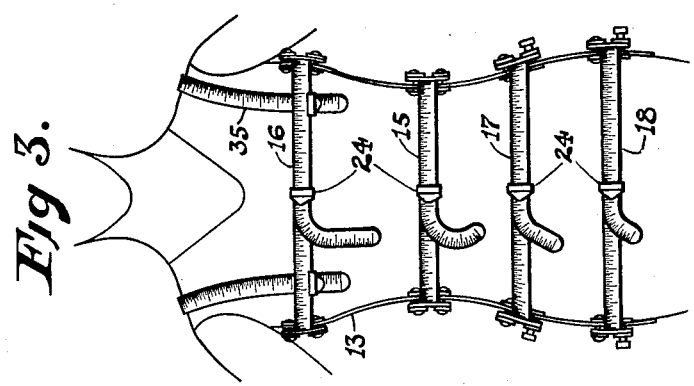
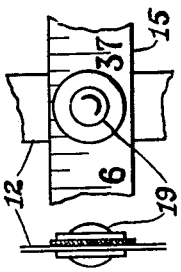
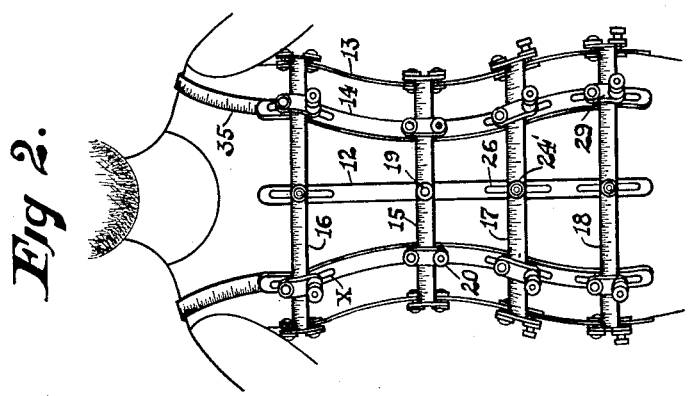
Inventor
*Bertha M. Stradling*
By
*Hiram A. Sturges*  Attorney Patented Nov. 21, 1933

1,935,998

UNITED STATES PATENT OFFICE 1,935,998

CORSET-MEASURING DEVICE

Bertha M. Stradling, Blair, Nebr.

Application October 8, 1932. Serial No. 636,929

1 Claim. (Cl. 33—15)

This invention relates to a measuring device for use of an operator to determine a correct form for a corset or similar garment, and has for its object, broadly, to provide a device which will be convenient in use and will permit measurements to be made with greater correctness than ordinary, so that a corset when completed will fit the body correctly and will be comfortable to the wearer.

Since there is such a variety in the forms and physical proportions of individuals, as well as occasional imperfections in body development, it appears to be necessary to make accurate measurements in all such instances so that the corset when completed will fit the body accurately and will be comfortable in use.

The invention includes a plurality of upright, elastic strips or thin metallic bars adapted to be fitted to the back and beneath the arm pits and having a longitudinal form conforming to the curvatures of the waist and thighs for supporting flexible measuring-strips transversely thereon, said strips extending around the body while thus supported so that suitable marking or recording may be made of said measurements, the metallic parts and measuring-strips being supported from the shoulders, and the horizontal or transversely disposed measuring-strips being slidingly attached to the metallic carrier-bars to permit the latter to slide downwardly in a degree sufficient to make accurate measurements of the curvatures of the hips, and means being provided for locking the measuring-strips to the metallic carrier-bars while markings are recorded of all the measurements.

With the foregoing objects in view the invention presents a new and useful construction, combination and arrangement of parts as described herein and claimed, and as illustrated in the accompanying drawings, it being understood that changes may be made in form, size, proportions and minor details, said changes being within the scope of the invention as claimed.

In the drawings, Fig. 1 is a view of the rear or outer side of the device, the shoulder supports or measuring-strips being broken and the holders or fasteners for the flexible measuring-strips or tapes being omitted.

Fig. 2 is a view showing the device applied to the rear part of the body, and Fig. 3 is a view of the same applied to the front part of the body.

Figs. 4 to 11, inclusive, relate to details.

Fig. 4 is an edgewise view of an adjustable clasp and part of a measuring-strip, and Fig. 5 is a front view of the same.

Fig. 6 is an edgewise view of a stationary clasp and part of a measuring-strip, and Fig. 7 is a front view of the same.

Fig. 8 is an edgewise view of a stationary clamping-pin or pivot, and part of a measuring-strip, and Fig. 9 is a side view of the same.

Fig. 10 is an edgewise view of a slidable clasp and part of a measuring-strip and Fig. 11 is a side view of the same. Fig. 12 is a detail relating to Fig. 1.

Referring now to the drawings for a more particular description, the corset measuring device consists, in part, of an upright elastic carrier-bar 12 adapted to be disposed upon the back of a person at the medial line thereof.

Numerals 13 indicate a pair of upright, elastic side carrier-bars adapted to extend downwardly from the arm pits, and at 14 are indicated intermediate upright elastic carrier-bars.

Numerals 15, 16, 17 and 18 indicate flexible measuring-strips which are disposed transversely of and which are connected with the elastic bars mentioned in such a manner that accurate measurements may be made for a corset which will correctly fit the body of the wearer, these strips having an adequate length to extend around the body as shown in Figs. 2 and 3 of the drawings.

The strip 15, for measuring the waist, is secured to the elastic bar 12 by means of a pivot pin 19 and its connections with the elastic bars 13 and 14 are such that it may have sliding movements transversely thereof, clasps 20 (Figs. 6 and 7) being used on said bars 13 and 14 to permit the strip 15 to have these sliding movements.

It will be seen that the measuring-strip 15 may have these sliding movements through the clasps 20 while secured by the pivot pin 19 to the bar 12, each clasp 20 consisting simply of a small plate 21, spacing-members or washers 22 disposed between the plate and a bar and rivets 23 being used which traverse the washers to secure them to the plate and to the bar, and the washers having such a thickness that the measuring-strip 15 may slide freely.

In the use of the device, after the measuring-strip 15 has been adjusted around the waist, its end-portions may be connected by any suitable means as by a hook or buckle indicated at 24 (Fig. 3), the upright elastic bar 12, as mentioned, being disposed upon the back at the medial line thereof.

Since the upright elastic carrier-bars 13 and 14 may have sliding movements on the measuring-strip, they may have suitable inclinations conforming to the curvatures above and below the waist line.

The strip 16 is for bust measurements. Any lengthwise movement of this strip 16 relative to the bar 12 is prevented since it is carried by a sliding clasp 24'. These clasps 24' are used only for the carrier bar 12. By referring to Figs. 10 and 11 of the drawings it will be seen that each sliding clasp consists simply of a screw 25 which engages in a slot 26 and traverses a washer 27 and the measuring strip, the screw being provided with a nut 28, and it will be seen that while the strip 16 may not have lengthwise movements it may be adjusted transversely, the screw moving in the slot 26.

The carrier-bars 14 at their upper ends, are provided with adjustable clasps 29 for a connection with and control of the measuring strip 16. As best shown in Figs. 4 and 5 of the drawings, each adjusting clasp consists of a small plate 30 adapted to lie upon spacing members or washers 31 which are disposed between the plate 30 and a carrier-bar 14, a rivet 32 operating to secure one of the washers in its position between the plate and said carrier-bar, 14, a screw 33 being also used which traverses said carrier-bar, a washer and said plate 30, a nut 34 being used on the screw 33 for rotation on the screw for maintaining the plate in stationary relation with the carrier-bar 14 after an adjustment has been made, said screw and rivet moving for said adjustment in a slot x which is formed in said carrier-bar.

It will be seen, by referring to Fig. 1 of the drawings that the carrier-bars 12 and 14 have a greater length than the length of the carrier-bars 13, so that measurements may be taken for portions of a corset at the back and front parts of the body at points above the arm pits.

The connection for the measuring-strip 16 with the carrier-bars 13 should be approximately the same as shown in Figs. 6 and 7 of the drawings, and as described, the measuring-strip 16, while held stationary with the bar 12 as to longitudinal movements, may have lengthwise movements through the clasps on the bars 13 and 14, and said bars 14 may have sliding movements on the strip 16 to be disposed at suitable inclinations corresponding to curvatures of the body.

Since it is desirable to provide for adjustments both longitudinally and transversely of the carrier-bars for the measuring-strips 17 and 18 below the strip 15 of the waist line, I therefore provide the adjustable clasps 29, best shown in Figs. 4 and 5, and by use of these clasps the upright elastic carrier bars 13 and 14 may be disposed at suitable inclinations corresponding to the curvatures of the thighs.

It will be appreciated that, by use of the device, bodily measurements may be readily made of persons of various proportions, the slots which are provided for the carrier-bars being depended upon in part for this purpose, and the slidable feature of the carrier-bars being depended upon in part for the adjustments mentioned.

Numerals 35 indicate a pair of shoulder strips for ascertaining the length needed for shoulder supports in instances when these supports are required, and for use in all instances for maintaining the device in a normal position while the flexible strips and carrier-bars are being adjusted.

As best shown in Figs. 2 and 3 of the drawings, the measuring strips 35 are each secured to the upper end of an additional carrier-bar 14, its opposite end being suitably secured to a flexible measuring-strip at the front of the body.

It has been stated that a hook or buckle 24 may be used for connecting one end of a tape or measuring strip with another part thereof. If hooks are used, they may engage in eyelets 36 which are provided for the measuring strips.

The elastic bars 12, 13 and 14 are provided with numerals at uniform intervals above and below the waist-line strip 15 for use when making adjustments and recording measurements.

In some instances, when it is desired to take a high bust measurement the end-portion of the uppermost measuring strip 16 may be detached from the bars 13 for this purpose, this feature being shown in Fig. 1 for one end-portion of said strip.

I claim as my invention,—

In a corset measuring device, an upright elastic carrier-bar adapted to engage the back at the medial line, a pair of upright elastic side carrier-bars, secondary upright elastic carrier-bars between the first named carrier-bar and side carrier-bars, a flexible waist line measuring-strip secured to the first named carrier-bar and attached to the secondary and side carrier-bars to permit sliding movements transversely of said bars, a flexible breast line measuring-strip arranged to have a sliding connection with the secondary and side carrier-bars transversely thereof and permitting sliding movements longitudinally of said first named carrier-bar, a pair of shoulder engaging measuring-strips each carried by one of the carrier-bars and adapted to be secured to a flexible measuring-strip, a plurality of flexible measuring-strips below the flexable waist line measuring-strip each attached to permit sliding movements longitudinally of an upright carrier-bar, and means on the upright carrier-bars under control of an operator to prevent sliding movements of certain selected measuring-strips relative to said upright carrier-bars.

BERTHA M. STRADLING.